F. H. Manny,
Mower.

No. 38969.  Patented June 23, 1863.

UNITED STATES PATENT OFFICE.

FREDERICK H. MANNY, OF ROCKFORD, ILLINOIS.

IMPROVEMENT IN HARVESTERS.

Specification forming part of Letters Patent No. 38,969, dated June 23, 1863.

*To all whom it may concern:*

Be it known that I, FREDERICK H. MANNY, of Rockford, in the county of Winnebago and State of Illinois, have invented a certain new and useful Improvement in Harvesters, of which the following is a full, clear, and exact description, reference being had to the accompanying drawings, which make part of this specification, and in which—

Figure 1:
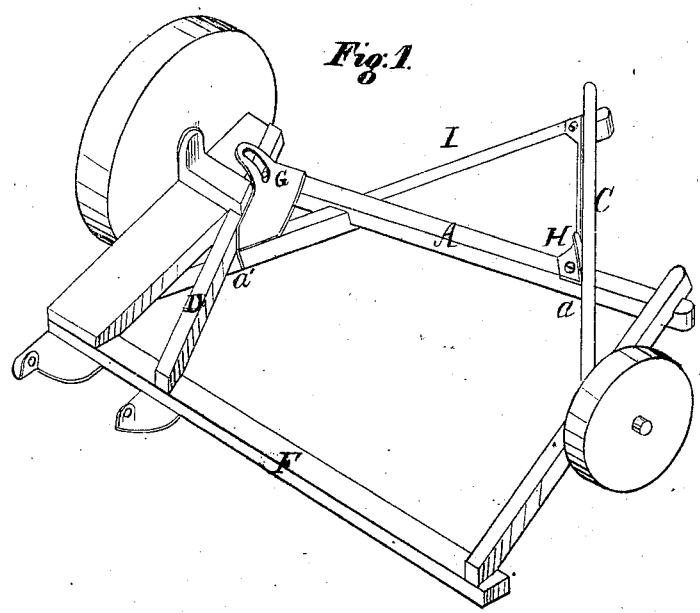
Figure 2:
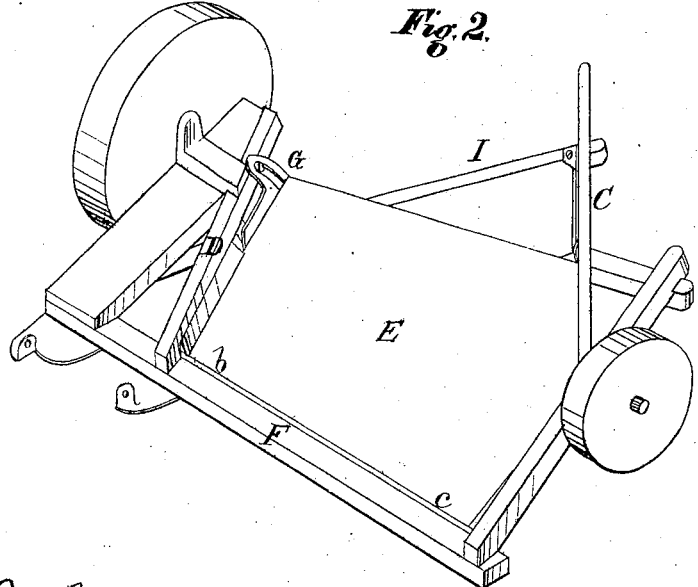

Figure 1 represents a view in perspective of so much of a "John H. Manny" harvester embracing my improvement as is necessary to illustrate my invention, the machine being shown as cutting close to the ground and with the platform tilted upon its axis, as it would be in such a machine when cutting a short stubble; and Fig. 2, a similar view of the same, with the rear end of the platform lowered until it is horizontal, or nearly so, as provided for in my invention.

In all that class of machines having the finger-beam in advance of the driving-wheel (of which that known as the "John H. Manny" machine is a prominent type) it is found necessary to tilt the frame upon its axis of oscillation in order to raise and lower the cutting apparatus. This tilting of the frame has heretofore formed a serious objection to the use of these machines, as the raker, when cutting short and lodged grain, is obliged to rake the grain up a steep inclined plane, which is laborious and exhausting; and, besides, involves the straggling and wasting of the grain, owing to the imperfect delivery.

It is the object of my invention to remedy these defects in this class of machines; and to this end my invention consists in severing the rear frame-timbers of the machine, which sustain the rear end of the platform, at or near their points of intersection with the side pieces of the frame, and in suspending them and the platform in adjustable brackets.

In the accompanying drawings, the timbers of the frame are shown in the form as united in the John H. Manny machine, A being the rear frame-beam, intersected at $a$ and $a'$ by the braces C and D on opposite sides of the platform E, which is hinged or pivoted on its front edges to the finger-beam F, at $b$ and $c$, and securely fastened at its rear end to the severed portion of the rear frame-beam and brace. This beam A is severed, together with the cross-brace I, at each end on the inner sides of the braces C and D, and to the severed part of the beam A and the brace I, at the points intersected by the braces C and D, are securely attached the brackets G and H. These brackets are slotted to secure set-screws, which fasten into the braces, and thus the platform is rendered vertically adjustable to such an extent that it can always be kept nearly or quite horizontal, whatever the distance of the finger-beam from the ground, and thus, notwithstanding the distance of the finger-beam from the ground, has to be changed to suit the character and condition of the crop to be cut, the horizontal position of the platform can always be controlled at the will of the operator, however much it may be found desirable to tilt the frame to render the cutting apparatus the most effective.

It is obvious that when the machine is to be used as a mower the hinged platform can be removed and the beam A and brace I brought up flush with the severed ends of the beam and brace, and there secured by the screw and bracket without any injurious diminution of the strength of the frame.

It is also obvious that other modes of adjustment may be adopted without affecting the principles of my invention.

What I claim as my invention, and desire to secure by Letters Patent, is—

In that class of harvesting-machines having the finger-beam forward of the driving-wheel, the combination of the hinged platform with the divided frame, when made adjustable, substantially in the manner and for the purpose described.

In testimony whereof I have hereunto subscribed my name.

FREDERICK H. MANNY.

Witnesses:
JAMES L. LINDEMAN,
J. G. MANLOVE.